US011613378B2

(12) United States Patent
Bergeret et al.

(10) Patent No.: US 11,613,378 B2
(45) Date of Patent: Mar. 28, 2023

(54) SYSTEM FOR SECURING A DASHBOARD OF AN AIRCRAFT COCKPIT

(71) Applicant: STELIA AEROSPACE, Rochefort (FR)

(72) Inventors: Christian Bergeret, Saint-Orens de Gameville (FR); Gilles Andrieu, Montberon (FR); Alexandre Branco, Pin-Balma (FR)

(73) Assignee: AIRBUS ATLANTIC, Rochefort (FR)

( * ) Notice: Subject to any disclaimer, the term of this patent is extended or adjusted under 35 U.S.C. 154(b) by 0 days.

(21) Appl. No.: 17/312,647

(22) PCT Filed: Dec. 3, 2019

(86) PCT No.: PCT/EP2019/083383
§ 371 (c)(1),
(2) Date: Jun. 10, 2021

(87) PCT Pub. No.: WO2020/126451
PCT Pub. Date: Jun. 25, 2020

(65) Prior Publication Data
US 2022/0048641 A1 Feb. 17, 2022

(30) Foreign Application Priority Data
Dec. 18, 2018 (FR) ...................... 1873217

(51) Int. Cl.
*B64D 47/08* (2006.01)
*B64D 43/00* (2006.01)
*B64F 5/10* (2017.01)

(52) U.S. Cl.
CPC ................ *B64D 43/00* (2013.01); *B64F 5/10* (2017.01)

(58) Field of Classification Search
CPC ........... B64D 43/00; B64D 47/08; B64F 5/10; G06V 10/141; G06V 40/174;
(Continued)

(56) References Cited

U.S. PATENT DOCUMENTS 8,887,208 B1 * 11/2014 Merrit ................ H04N 21/4516
455/431
9,864,917 B1 * 1/2018 Kronfeld ................... G06T 7/74
(Continued)

FOREIGN PATENT DOCUMENTS

| FR | 2980456 A1 * | 3/2013 |
| FR | 2980456 A1 | 3/2013 |
| FR | 2991295 A1 | 12/2013 |

OTHER PUBLICATIONS

Search Report from the French Intellectual Property Office on corresponding FR application (FR1873217) dated Sep. 24, 2019.
(Continued)

*Primary Examiner* — Mcdieunel Marc
(74) *Attorney, Agent, or Firm* — KOS IP Law LLP

(57) ABSTRACT

A cockpit suitable for being installed in a pilot's cabin of an aircraft, the cockpit comprising a floor, a plurality of interior furniture items and a dashboard configured to receive a plurality of devices for commanding and/or controlling the aircraft, the cockpit comprising a securing system which connects the dashboard solely to the floor and/or to the plurality of interior furniture items.

9 Claims, 4 Drawing Sheets

(58) Field of Classification Search
CPC .. G06V 20/597; G06V 40/161; G06V 40/172; G06V 20/59; G06V 40/103; G06V 40/15; G06V 40/16; G06V 2201/02; G06V 30/10; A61B 5/4809; A61B 5/18; A61B 5/1128; A61B 2503/22; A61B 5/6888; G08B 21/06; G06T 7/74; G06T 2207/10048; G06T 2207/30268; G06K 9/6267

See application file for complete search history.

(56) References Cited

U.S. PATENT DOCUMENTS

| | | | | |
|---|---|---|---|---|
| 11,151,810 | B2* | 10/2021 | Ryan | G05B 23/0232 |
| 2007/0019297 | A1* | 1/2007 | Stewart | G02B 27/0149 |
| | | | | 359/630 |
| 2014/0175225 | A1 | 6/2014 | Durand et al. | |
| 2014/0313411 | A1* | 10/2014 | Merritt | H04N 21/41407 |
| | | | | 348/469 |
| 2016/0366376 | A1* | 12/2016 | Merritt | H04N 21/41407 |

OTHER PUBLICATIONS

International Search Report and Written Opinion on corresponding PCT application (PCT/EP2019/083383) from International Searching Authority (EPO) dated Mar. 9, 2020.
Ben Soarbywire: "Main Instrument Panel Support Structure | Soarbywire", Aug. 9, 2018, XP055596097, URL:https://soarbywire.com/2018/08/09/main-instrument-panel-support-structure/.

* cited by examiner

SYSTEM FOR SECURING A DASHBOARD OF AN AIRCRAFT COCKPIT

TECHNICAL FIELD

The present invention relates to mounting an aircraft cockpit and is more particularly directed to a fastening system for an instrument panel of an airplane cockpit.

BACKGROUND

In a known manner, an airplane cockpit, mounted in a pilot cabin, comprises a plurality of interior furniture items allowing various pieces of equipment necessary to pilot the airplane, such as monitor screens and flight control devices, to be received.

More precisely, the cockpit comprises, in a known manner, a central bracket, arranged between the two seats intended for the pilot and the co-pilot of the airplane and generally comprising the engine control lever, two side brackets, disposed on either side of the cockpit and each accessible by the pilot or the co-pilot, and an instrument panel, extending substantially transversely to the front of the cockpit. Such an instrument panel is especially configured to present various screens displaying data relating to navigation to the pilot and co-pilot.

In this document, the term transverse is defined with reference to FIG. 1, in which, by way of example, an airplane 100 extends longitudinally along an X axis, laterally along a Y axis and vertically along a Z axis so as to form an orthogonal reference frame (X, Y, Z). In such a reference frame, the term "transverse" defines an object extending along the width of the airplane 100 in the (Y, Z) plane. Furthermore, in such a reference frame, front and rear are defined along the X axis with reference to the displacement of the airplane 100 in flight. In other words, still with reference to FIG. 1, the front and rear of the airplane 100, and therefore of the pilot cabin 110, are defined along the X axis in FIG. 1 which is oriented from the rear to the front.

To date, as represented in FIG. 2, an instrument panel 101 is generally fastened to the structure of the airplane by means of two metal feet 102 connecting the instrument panel 101 to the floor, as well as by a set of metal connection elements connecting the instrument panel 101 directly to the inner walls of the pilot cabin, that is directly to the fuselage of the airplane. As an example, an instrument panel is generally fastened to the front by means of connecting rods 103 directly connecting the instrument panel 101 to the windscreen frame of the airplane.

However, such a fastening system has many drawbacks. Indeed, the metal feet, which are machined and therefore complex and expensive to manufacture, dramatically increase the weight of the interior furniture items, causing additional stresses in the floor to which the metal feet are fastened. In addition, the direct transfer of the connecting rods to the main structure of the airplane has the drawback of generating significant stresses in the connections of the instrument panel, making it necessary to reinforce the instrument panel structure to withstand such loads.

Moreover, when the airplane is in flight, its main structure, and especially the fuselage, undergoes deformations due to the flight conditions (pressure, speed of the airplane, etc.). As the instrument panel is directly connected to the fuselage, it is highly loaded. Such deformations lead to an increase in the loads in the connections, resulting in an increase in the stresses in the instrument panel itself, which has the drawback of requiring a more robust and therefore heavier instrument panel structure, which is more complex to manufacture and more difficult to fit in the cockpit, which moreover increases the painfulness of the operators.

Furthermore, such a fastening system for the instrument panel, directly connected to the main structure of the airplane, has the drawback of requiring adaptation to each type of airplane. Indeed, the shape of the fuselage differs according to the different types of airplane, which means that the size of the connecting rods and the fastening points, for example on the windscreen frame, has to be significantly adapted. Each fastening system for an instrument panel thus becomes specific to a type of airplane, which does not allow for harmonization of the fastening system, resulting in increased costs and logistics for manufacturing, storage and assembly.

One of the objectives of the present invention is to provide a simple, economical fastening system for an instrument panel which limits loads transmitted in the instrument panel, so as to provide a simplified and lighter fastening system for an instrument panel, and the transfer points of which are not directly connected to the airplane fuselage. One purpose of the invention is also to provide a fastening system adaptable to any type of airplane, allowing the cockpit to be assembled outside the airplane structure, thus limiting costs and assembly time of the complete cockpit.

From document FR2980456A1, an instrument panel fastened to the floor of the pilot cabin by means of two lateral feet and two central feet is known, each central foot consisting of a pair of jacks allowing the instrument panel to be tilted. Document FR2980456A1 teaches to connect the instrument panel to the side mini-handle blocks which are supported laterally on the main interior structure of the pilot cabin. This document does not address the problem of the force transmission between the main structure of the airplane and the interior furniture items of the cockpit.

SUMMARY

To this end, the invention relates to a cockpit adapted to be mounted in a pilot cabin of an aircraft, said cockpit, comprising a floor, a plurality of interior furniture items and an instrument panel, configured to receive a plurality of devices for controlling and/or monitoring said airplane, said cockpit comprising a fastening system connecting said instrument panel only to said floor and/or to said plurality of interior furniture items.

Such a fastening system advantageously makes it possible to dissociate the instrument panel from the airplane fuselage or from the windscreen frame, making it possible to dispense with movements and deformations of the airplane structure during a flight. The fastening system according to the invention thus makes it possible to limit loads in the fastening members of the instrument panel, thus making it possible to limit stresses in the instrument panel. Furthermore, the fastening system according to the invention allows a pre-assembly of the complete cockpit outside the airplane, thus limiting the assembly time as well as the costs.

The invention further relates to a cockpit adapted to be mounted in a pilot cabin of an aircraft, said cockpit comprising a floor, at least one central bracket and two side brackets and an instrument panel, configured to receive a plurality of devices for controlling and/or monitoring said aircraft, said cockpit comprising a fastening system comprising a plurality of fastening members directly connecting the instrument panel to the central bracket and both side brackets.

Advantageously, this allows for the load distribution due to the weight of the instrument panel and the pieces of equipment at different points of the instrument panel. The addition of additional support points on the furniture items further optimizes the load distribution in the instrument panel. Such a transfer on the interior furniture items further allows load transfer also by the feet of the interior furniture items of the cockpit, advantageously allowing a better distribution in the load transmission on the floor, thus limiting risks of local overstresses.

Preferably, said plurality of interior furniture items comprising at least one central bracket and two side brackets, the instrument panel is only fastened to the floor, to said central bracket and to each of said two side brackets.

Even more preferably, the fastening system comprises at least three furniture fastening members.

According to one characteristic of the invention, the fastening system comprises at least two floor fastening members.

According to one aspect of the invention, the fastening system comprises at least one floor fastening member connecting the floor to the instrument panel, said floor fastening member comprising at least one ball joint. Such a ball joint makes it possible to compensate for any manufacturing clearances, such as the inaccuracy of a fastening hole for example, while making it possible to absorb displacements of the floor in flight, due to the deformations of the primary structure of the airplane.

Preferably, the floor fastening member is in the form of an adjustable length connecting rod. Such a floor fastening member makes it possible to adapt the fastening of the instrument panel at different points of the floor by dispensing with manufacturing tolerances of the different elements. Such floor fastening members also allow the fastening system to be adapted to different cockpit configurations, for example placed in different airplane models of different manufacturers.

Preferably, said instrument panel comprising a central portion and two side portions, the fastening system comprising a plurality of floor fastening members, said plurality of floor fastening members comprises at least one side fastening member fastened to one of the side portions of the instrument panel according to a fastening point, and at least one central fastening member fastened to the central portion of the instrument panel at a fastening point.

Such a fastening system advantageously allows load transfer over the entire instrument panel, which allows better stress distribution, thus limiting local overstresses which may originate damage to the structure of the instrument panel.

Preferably, said pilot cabin having a rear and a front, said cockpit comprising a front end to be positioned at the front of the pilot cabin, said floor extending horizontally into the cockpit, the side fastening member being connected to the instrument panel via a fastening point, said side fastening member extends from said fastening point towards the floor in a direction extending towards the front end of the cockpit.

Preferably, said side fastening member forms an angle β with a vertical axis extending from the fastening point, angle β. Such an angle β advantageously allows load transfer along a longitudinal axis of the airplane, extending from the rear towards the front of the airplane, that is towards the pilot cabin. Such loads are especially important during take-off, landing or during a crash of the airplane, and the angled positioning thus ensures that the instrument panel is properly held in place, without it being related to the main structure of the airplane, whatever the stresses of forces and pressures to which the airplane and therefore the cockpit are subjected.

According to another aspect, as the instrument panel extends laterally, said plurality of furniture fastening members comprises two central fastening members which extend in different lateral directions from the instrument panel. Advantageously, this allows for load transfer in both directions of a lateral axis of the airplane.

Preferably, the two central fastening members have a common fastening point to the instrument panel.

Preferably, each center fastening member forms an angle $\theta_1$, $\theta_2$ with a vertical axis extending from the fastening point. Such an angle $\theta_1$, $\theta_2$ allows for optimal load transfer in the lateral axis of the airplane, allowing the entire weight of the pieces of equipment placed in the instrument panel to be maintained.

Preferably, the fastening system consists of a plurality of fastening members connecting the instrument panel to the floor and/or to said plurality of interior furniture items. In other words, no fastening member directly connects the instrument panel to said pilot cabin.

The invention also relates to a pilot cabin of an aircraft, the pilot cabin comprising a structural framework and a cockpit, as previously set forth, of which only the floor is fastened to the structural framework of the pilot cabin.

The invention further relates to a method for mounting a cockpit, as previously disclosed, in a pilot cabin of an aircraft, the cockpit comprising a structural framework, the method comprising:
- a step of fastening the instrument panel to the floor and/or to said plurality of interior furniture items to form the cockpit and
- a step of fastening the cockpit floor to the structural framework of the pilot cabin, the cockpit instrument panel not being fastened to the structural framework of the pilot cabin.

Preferably, the method comprises a step of positioning the cockpit assembled in the pilot cabin.

BRIEF DESCRIPTION OF THE DRAWINGS

The invention will be better understood upon reading the following description, given only by way of example, and referring to the appended drawings given as non-limiting examples, in which identical references are given to similar objects and in which.

It should be noted that the figures set out the invention in detail to implement the invention, said figures of course being able to serve to better define the invention if necessary.

DETAILED DESCRIPTION

Figure 1:
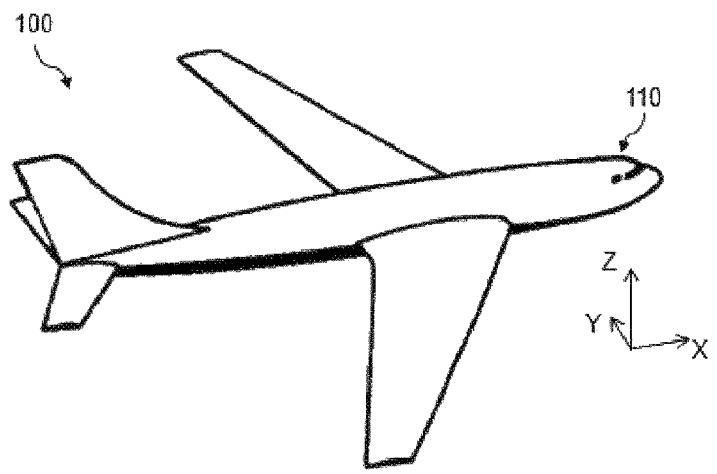
FIG. 1 is a schematic representation of an airplane.
Figure 2:
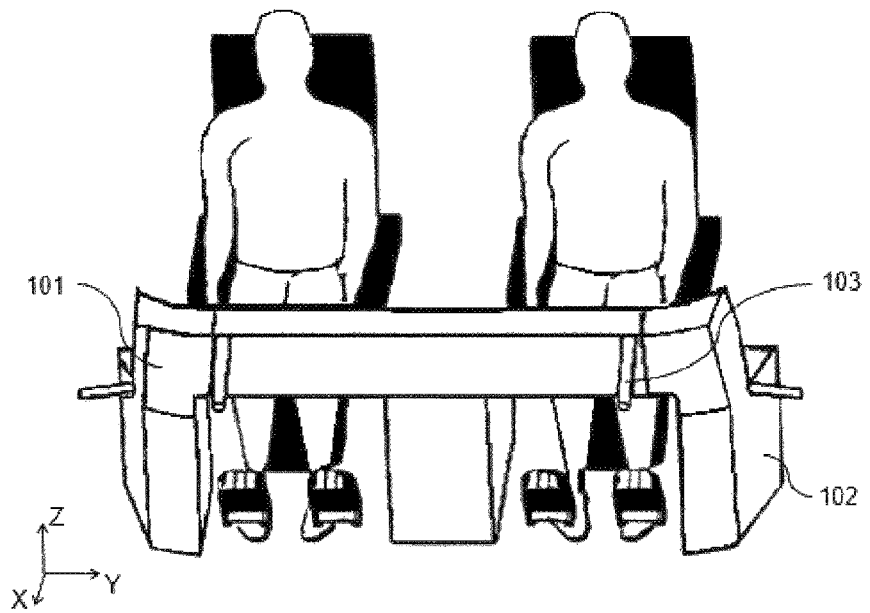
FIG. 2 schematically represents a rear view of a fastening system for an instrument panel according to prior art.

With reference to FIG. 1, an airplane 100 is represented extending longitudinally along an X axis oriented from back to front, laterally along a Y axis oriented from right to left and vertically along a Z axis oriented from bottom to top so as to form an orthogonal reference frame (X, Y, Z). In such a reference frame, the term "horizontal" defines an object extending in the (X, Y) plane and the term "transverse" defines an object extending in the (Y, Z) plane.

Figure 3:
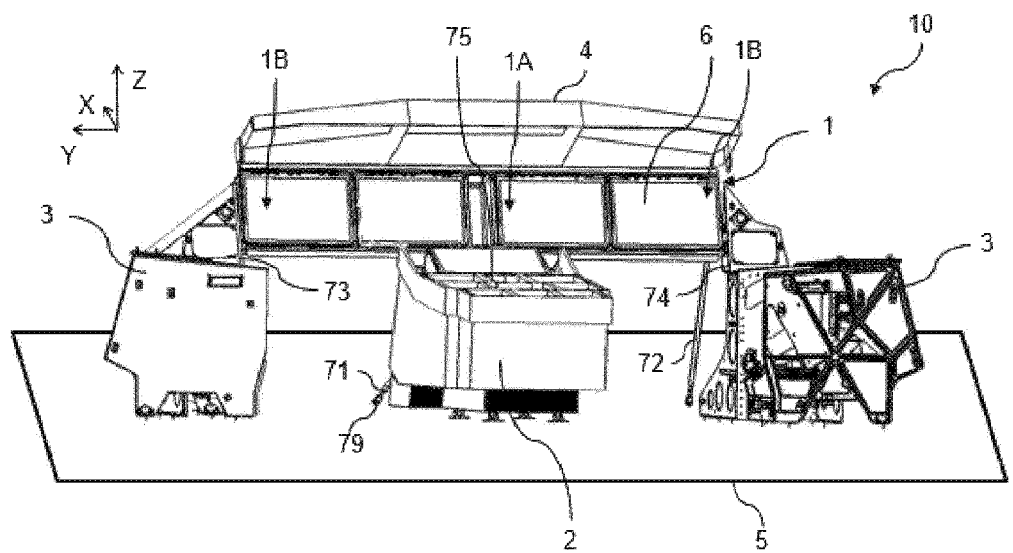
FIG. 3 is a front view of a cockpit comprising an instrument panel fastening system according to one embodiment of the invention.

In a known manner, the airplane 100 comprises at the front thereof a pilot cabin 110, delimiting the portion of the fuselage located at the front of the airplane 100 and in which the pilot and the co-pilot are situated. The pilot cabin 110 comprises a structural framework configured to receive a cockpit 10 (FIG. 3). According to one preferred embodiment of the invention, the cockpit 10 is configured to be mounted in the pilot cabin 110 after assembly of all the elements of the cockpit 10.

With reference to FIG. 3, a cockpit 10 is represented which is adapted to be mounted in the pilot cabin 110. The cockpit 10 comprises all of the devices necessary for flying the airplane 100. Such a cockpit 10 thus comprises an instrument panel 1, a plurality of interior furniture items and a floor 5, on which the interior furniture items rest. In this example, the plurality of interior furniture items comprises, a central bracket 2, disposed between the two seats intended for the pilot and co-pilot of the airplane 100 (not represented), and two side brackets 3, positioned on either side of the cockpit 10 and each accessible by the pilot or co-pilot. Each of the interior cabinets is configured to accommodate a plurality of navigation control and/or monitor devices for the airplane 100, such as the engine control lever (commonly referred to as the throttle lever), control buttons or fuel or altitude control gauges for example.

In the cockpit 10, the floor 5 extends horizontally, that is in a plane parallel to the (X, Y) plane, and is configured to receive all the interior furniture items. Such a floor 5 is configured to be mounted in the pilot cabin 110 and to be fastened to the fuselage of the airplane 100, in particular the structural framework of the pilot cabin 110, so as to secure the cockpit assembly 10 to the main structure of the airplane 100.

Indeed, according to one preferred embodiment, the cockpit 10 according to the invention is configured to be assembled outside the airplane 100 and to be mounted in the pilot cabin 110 once all the components have been assembled. In other words, the cockpit 10 according to the invention, integrated into the pilot cabin 110, directly comprises the floor 5 on which the interior furniture items and the instrument panel 1 are already mounted, which thus do not comprise a direct fastening to the main structure of the airplane 100. Thus, the furniture items are mounted to the main structure of the airplane 100 via the floor 5.

Still referring to FIG. 3, the instrument panel 1 comprises a central portion 1A and two side portions 1B and extends substantially transversely into the cockpit 10. In other words, the length of the instrument panel 1 extends across the width of the airplane 100, along the axis Y so as to present a set of flight control and/or monitor devices, for example a plurality of display screens 6, to the pilot and co-pilot.

In the remainder of this document, the front of the instrument panel 1 defines the surface facing the pilot and co-pilot in flight, that is the face of the instrument panel 1 oriented towards the rear of the cockpit 10. In other words, the front and rear of the instrument panel 1 are reversed with respect to the front and rear of the cockpit 10.

Figure 4:
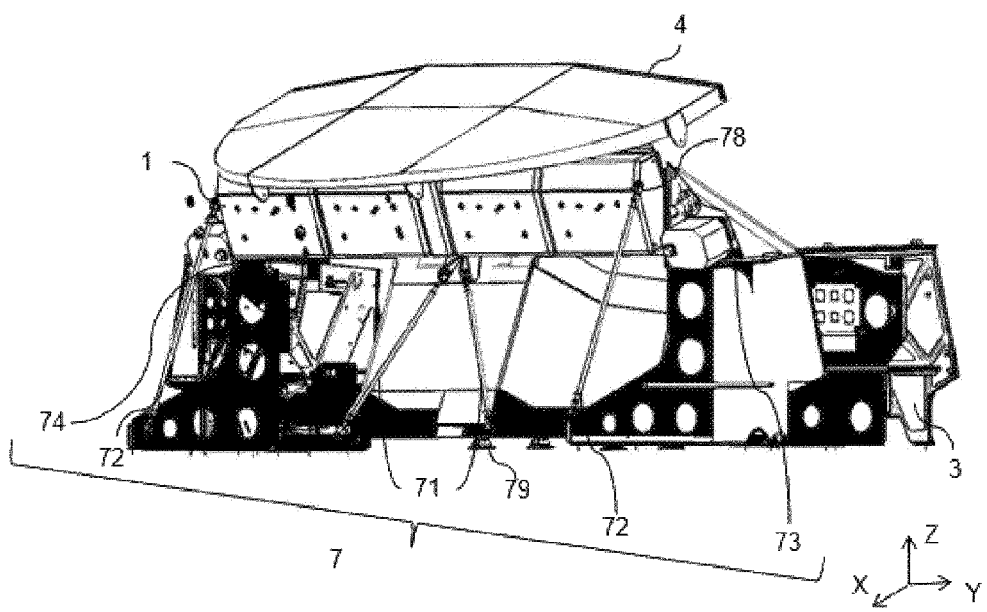
FIG. 4 is a back view of the cockpit comprising the fastening system of FIG. 3.

According to one preferred embodiment of the invention, with reference to FIG. 4, the instrument panel 1 comprises a fastening system 7 configured to allow the instrument panel 1 to be fastened only to the cockpit elements 10. In other words, the instrument panel 1 can, by virtue of the fastening system 7, be mounted on the cockpit 10 outside the pilot cabin 110, which represents a significant time saving upon assembling the airplane 100, thus allowing for a cost reduction. Mounting the cockpit 10 outside the pilot cabin 110 further improves handling of the components by operators, as well as the accessibility of the fastening members. Indeed, by virtue of the invention, operators can readily move around the cockpit 10, without being hindered by the fuselage which quite often delimits a narrow pilot cabin 110.

Such a fastening system 7 also makes it possible to dispense with direct fasteners between the instrument panel 1 and the structural framework of the pilot cabin 110, advantageously making it possible to limit loads transmitted by the main structure of the airplane 100 and thus to limit stresses in the instrument panel 1. Indeed, when the airplane 100 is in flight, its fuselage undergoes deformations due to the speed of the airplane 100 and to the difference in pressure applied to the surfaces of the airplane 100. Also, fastening the instrument panel 1 only to the cockpit 10 advantageously avoids stressing the instrument panel 1 due to the deformation movements of the airplane 100.

In one preferred embodiment of the invention, with reference to FIG. 4, the fastening system 7 comprises a plurality of fastening members for connecting the instrument panel 1 to the floor 5 as well as to the central bracket 2 and the side brackets 3. Preferably, the fastening system 7 comprises a plurality of fastening members for connecting the instrument panel 1 to the floor 5 of the cockpit 10, referred to as "floor fastening members", and a plurality of fastening members corresponding to support and fastening points of the instrument panel 1 to the interior furniture items of the cockpit 10, referred to as "furniture fastening members".

With reference to FIGS. 3 and 4, the fastening system 7 according to the invention comprises four floor fastening members 71, 72 and three furniture fastening members 73, 74, 75 connecting the instrument panel 1 respectively to the central bracket 2 and to each side bracket 3.

According to one preferred aspect of the invention, the floor fastening members comprise two side fastening members 72 fastened to the side portions 1B of the instrument panel 1, and two central fastening members 71 fastened to the central portion 1A of the instrument panel 1. In this example, each floor fastening member is in the form of a connecting rod, directly connecting the instrument panel 1 to the floor 5 of the cockpit 10. Such connecting rods have the advantage of being connected by means of rigid and solid rods, the ends of which are articulated in such a way as to be able to adapt to the position of the fastening points on the floor 5. By way of example, such rods make it possible to compensate for differences in the position of the fastening points of the floor 5.

In this embodiment, each connecting rod comprises a longitudinal body and two fastening ends which are respectively connected to the longitudinal body by two ball joints in order to ensure optimal orientation and flexibility during positioning.

In this preferred embodiment, again with reference to FIG. 4, the fastening system 7 consists of two central fastening members 71 and two lateral fastening members 72, respectively connected to the central portion 1A and to the lateral portions 1B of the instrument panel 1.

Figure 5:
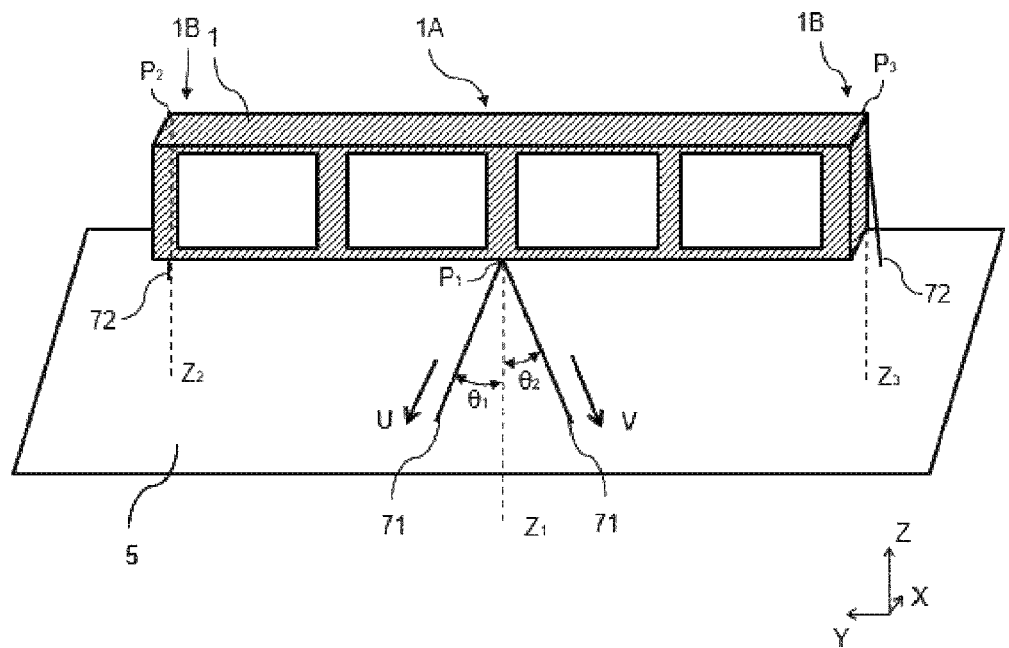
FIG. 5 schematically represents the floor fastening members of the fastening system of FIG. 3.
Figure 6A:
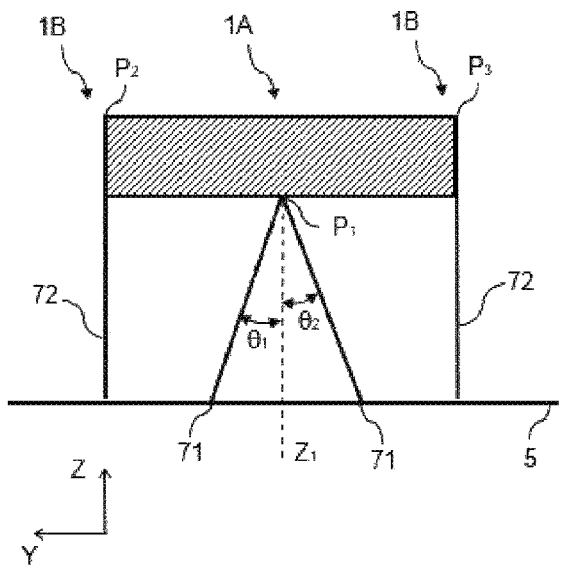
FIG. 6A is a rear view of the positioning and orientation of the floor fastening members of FIG. 5.

As is represented in FIGS. 5 and 6A, the central fastening members 71 are connected to a common fastening point P1 of the instrument panel 1, positioned substantially in the middle of the length of the instrument panel 1. Nevertheless, it goes without saying that a fastener at two different points could also be suitable.

The central fastening members 71 extend on either side of the center of the instrument panel 1, in different directions, designated U and V in this example. Preferably, each central fastening member 71 forms, in the (Y, Z) plane, with a vertical axis Z1 (parallel to the Z axis) passing through the common fastening point P1, an angle $\theta 1$, $\theta 2$ allowing the transfer of lateral loads (that is along the lateral axis Y). Preferably, the angles $\theta 1$ and $\theta 2$ are equal and opposite so as to allow an optimal balance of the supports of the instrument panel 1, as well as a distribution of the lateral loads in the floor 5. In this example, the angles $\theta 1$ and $\theta 2$ allow for transfer of loads related to the movements of the airplane 100 along Y axis.

Figure 6B:
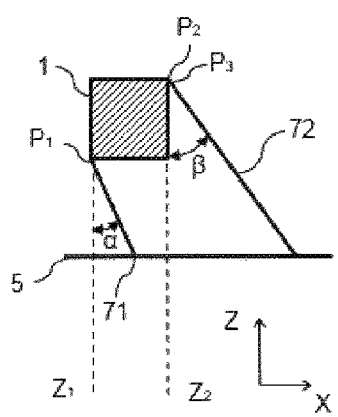
FIG. 6B is a side view of the positioning and orientation of the floor fastening members of FIG. 5 and FIG. 7 schematically represents a top view of the transfer points of the fastening system to a cockpit floor of FIG. 3.

With reference to FIG. 6B, each central fastening member 71 is also tilted towards the front of the cockpit 10, that is in the direction of the X axis, so as to also allow load transfer along the longitudinal axis of the airplane 100. Such a tilt makes it possible to limit loads in X in the other fastening members. Preferably, each central fastening member 71 forms an angle $\alpha$ in the plane (X, Z) with the vertical axis Z1 passing through the fastening point P1, for ensuring transfer of loads related to the acceleration and braking of the airplane. Such a configuration thus makes it possible to distribute loads due, for example, to the acceleration of the airplane 100 on take-off throughout the fastening members of the fastening system 7.

This document sets forth the example of two central fastening members 71 having identical tilt angles $\theta$ and $\alpha$, however it goes without saying that the angles $\theta$ and $\alpha$ could just as easily be different depending on the configuration of the airplane 100.

As is represented in FIGS. 5 and 6B, the lateral fastening members 72 are connected to fastening points P2, P3 positioned at the rear of the instrument panel 1, that is on the side pointing to the front of the pilot cabin 110, when the instrument panel 1 is mounted in the cockpit 10. Such fastening points P2, P3 are preferably placed on either side of the instrument panel 1, at the level of the side portions 1B. The lateral fastening members 72 extend in substantially parallel directions, towards the front of the cockpit 10, that is along axis X. Preferably, each lateral fastening member 72 forms, in the (X, Z) plane, respectively with a vertical Z2 axis (parallel to the Z axis) passing through the fastening point P2, and a vertical Z3 axis (parallel to the Z axis) passing through the fastening point P3, an angle $\beta$ allowing load transfer in the longitudinal direction of the airplane 100, that is in X direction.

This document sets forth the example of two lateral fastening members 72 having an identical tilt angle $\beta$, however it goes without saying that the angles of each lateral fastening member 72 could just as easily be different depending on the configuration of the airplane 100.

In a complementary manner, each lateral fastening member 72 could also be tilted laterally on either side of the instrument panel 1 so as to limit load on the central connecting rods in transferring side loads, that is in Y direction.

As each floor fastening member is fastened to the floor 5, the set of floor fastening members advantageously allows load transfer in the Z direction, that is acting along the height of the cockpit 10.

In order to ensure stability of the instrument panel 1, the fastening system 7 further comprises a plurality of furniture fastening members which are in the form of a plurality of transfer points 73, 74, 75, also referred to as support points, enabling the instrument panel 1 to be fastened to the interior furniture items of the cockpit 10. Such transfer points have the advantage of allowing a better load distribution on the floor 5.

Indeed, as represented in FIGS. 3 and 4, the fastening system 7 preferably comprises three transfer points 73, 74, 75, respectively connecting the instrument panel 1 to the two side brackets 3 and to the central bracket 2. In this example, such transfer points 73, 74, 75 are in the form of planar surfaces (not represented) directly resting on the interior furniture items and having a sufficiently large support area to limit local overstresses of the instrument panel 1. Such planar surfaces preferably comprise at least one fastening hole, preferably a plurality of holes (not represented), allowing the insertion of a screw or a rivet, for example, so as to fasten the instrument panel 1 directly to the central bracket 2 and to the side brackets 3.

As defined previously, the front of the instrument panel 1 corresponds to the surface facing the pilot and co-pilot in the cockpit 10. Also, in this example, the instrument panel 1 comprises a so-called "central" support surface, referred to as the central transfer point 75, located at the front of the instrument panel 1 on a lower surface and resting on the front of the central bracket 2. The instrument panel 1 further comprises two so-called "lateral" support surfaces, referred to as lateral transfer points, located at the ends at the front of the instrument panel 1 and each resting on a side bracket 3.

Such furniture fastening members allow, via the central bracket 2 and the side brackets 3, a better load distribution both in the instrument panel 1 and on the floor 5.

Figure 7:
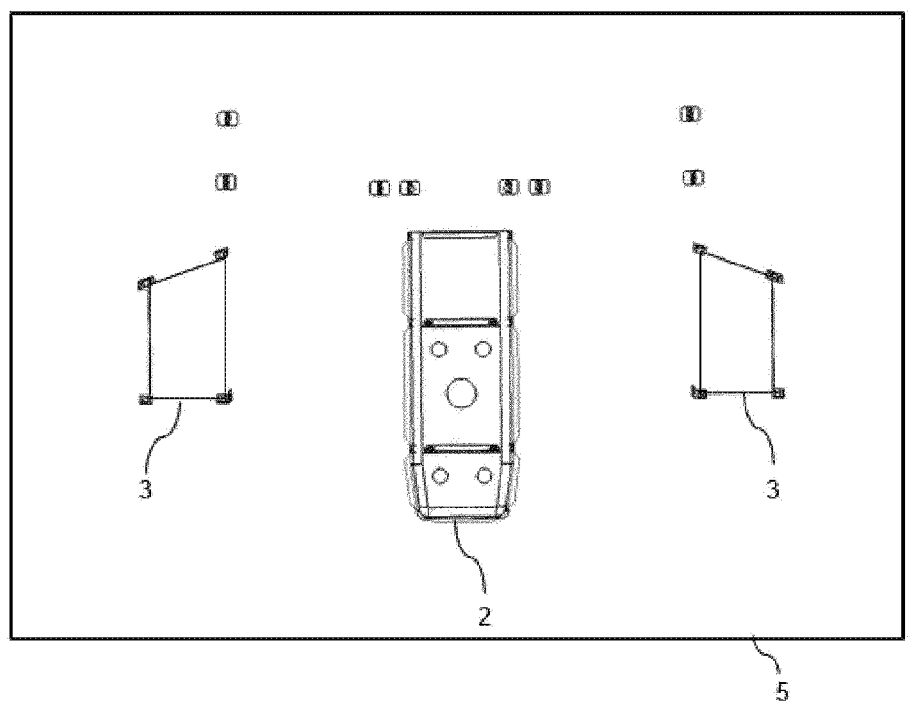

The fastening system 7 according to the invention advantageously allows the instrument panel 1 to be transferred only on the floor 5, directly or indirectly via the central bracket 2 and the side brackets 3, as represented in FIG. 7. Such a fastening system 7 makes it possible to dispense with direct transfer to the main structure of the airplane 100, that is to the fuselage, thus advantageously limiting load transmission due to deformations of the fuselage in flight. The limitation of load transmission has the advantage of limiting stresses in the instrument panel, thus limiting its wear or deterioration. Furthermore, the fastening system according to the invention advantageously allows the entire cockpit to be mounted outside the airplane, making it possible both to facilitate the integration of the cockpit 1 and to save time upon assembling the airplane. Such a mounting outside the airplane also facilitates both handling of the components by the operators and accessibility around the cockpit upon assembling the latter.

The invention claimed is:

1. A cockpit adapted to be mounted in a pilot cabin of an aircraft, said cockpit comprising a floor, a plurality of interior furniture items and an instrument panel, configured to receive a plurality of devices for controlling and/or monitoring said aircraft, said instrument panel extending laterally and comprising a central portion and two lateral portions, said cockpit comprising a fastening system connecting said instrument panel only to said floor and/or to said plurality of interior furniture items, the fastening system comprising a plurality of floor fastening members, said plurality of floor fastening members comprising at least one side fastening member fastened to one of the side portions of the instrument panel at a fastening point and two central fastening members, each central fastening member being fastened to the central portion of the instrument panel at a fastening point, the two central fastening members extending in different lateral directions from the instrument panel.

2. The cockpit according to claim 1, wherein, said plurality of interior furniture items comprising at least one central bracket and two side brackets, the instrument panel is only fastened to the floor, to said central bracket and to each of said two side brackets.

3. The cockpit according to claim 1, wherein, at least one floor fastening member of said plurality of floor fastening members comprises at least one ball joint.

4. The cockpit according to claim 1, wherein, at least one floor fastening member of the plurality of floor fastening members is in the form of an adjustable length connecting rod.

5. The cockpit according to claim 1, wherein, said pilot cabin having a rear and a front, said cockpit comprising a front end for positioning at the front of the pilot cabin, said floor extending horizontally in the cockpit, the side fastening member being connected to the instrument panel via a fastening point, said side fastening member extends from said fastening point towards the floor in a direction extending towards the front end of the cockpit.

6. The cockpit according to claim 1, wherein the fastening system consists of a plurality of fastening members connecting the instrument panel to the floor and/or to said plurality of interior furniture items.

7. The cockpit according to claim 1, wherein the two central fastening members have a common fastening point to the instrument panel.

8. A pilot cabin of an aircraft, the pilot cabin comprising a structural framework and the cockpit according to claim 1, of which only the floor is fastened to the structural framework of the pilot cabin.

9. A method for mounting the cockpit according to claim 1, in a pilot cabin of an aircraft, the pilot cabin comprising a structural framework, the method comprising:
- a step of fastening the instrument panel to the floor and/or to said plurality of interior furniture items to form the cockpit; and
- a step of fastening the floor of the cockpit to the structural framework of the pilot cabin, the instrument panel of the cockpit not being fastened to the structural framework of the pilot cabin.

* * * * *